United States Patent
Jammula et al.

(10) Patent No.: US 10,613,970 B1
(45) Date of Patent: Apr. 7, 2020

(54) METHOD AND SYSTEM FOR MANAGING DEPLOYMENT OF SOFTWARE APPLICATION COMPONENTS BASED ON SOFTWARE PERFORMANCE DATA

(71) Applicant: INTUIT INC., Mountain View, CA (US)

(72) Inventors: Navin Jammula, Dublin, CA (US); Raj Vasikarla, Pleasanton, CA (US); Gunjan Vora, Sunnyvale, CA (US); Suresh Vittala Gupta, Edmonton (CA); Adil Malik, Edmonton (CA)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/119,778

(22) Filed: Aug. 31, 2018

(51) Int. Cl.
*G06F 9/44* (2018.01)
*G06F 11/36* (2006.01)
*G06F 8/60* (2018.01)

(52) U.S. Cl.
CPC ............ *G06F 11/3688* (2013.01); *G06F 8/60* (2013.01); *G06F 11/3684* (2013.01)

(58) Field of Classification Search
CPC ............ G06F 11/3688; G06F 11/3664; G06F 11/3672
USPC .................. 717/123–129, 140–142
See application file for complete search history.

(56) References Cited

U.S. PATENT DOCUMENTS

| | | | | |
|---|---|---|---|---|
| 5,754,860 A * | 5/1998 | McKeeman | ........ | G06F 11/3684 714/E11.208 |
| 6,071,316 A * | 6/2000 | Goossen | ............ | G06F 11/3612 717/126 |
| 6,161,216 A * | 12/2000 | Shagam | ............. | G06F 11/3624 714/E11.209 |
| 6,543,047 B1 * | 4/2003 | Vrhel, Jr. | .................. | G06F 8/61 714/E11.208 |
| 6,944,849 B1 * | 9/2005 | Glerum | ............... | G06F 11/3688 712/227 |

(Continued)

OTHER PUBLICATIONS

Telea et al, "A Tool for Optimizing the Build Performance of Large Software Code Bases", IEEE, pp. 323-325 (Year: 2008).*

(Continued)

*Primary Examiner* — Anil Khatri
(74) *Attorney, Agent, or Firm* — Patterson + Sheridan, LLP

(57) ABSTRACT

Certain aspects of the present disclosure provide techniques for managing the deployment of software applications based on application performance data. Embodiments include transmitting, to a performance testing system, information identifying a test build of a software application component in a first deployment environment in a software development pipeline to test. Performance information for the test build of the software application component is received from the performance testing system. The received performance information for the test build of the software application component is compared to one or more of predetermined performance parameters or historical performance data for the software application component. Based on the comparing, the system takes one or more actions to manage deployment of the test build of the software application component to a second deployment environment in the software development pipeline.

20 Claims, 5 Drawing Sheets

(56) References Cited

U.S. PATENT DOCUMENTS

| | | | | |
|---|---|---|---|---|
| 6,958,643 | B2* | 10/2005 | Rosenthal | G05F 3/30 323/313 |
| 7,146,608 | B1* | 12/2006 | Newman | G06F 8/71 717/168 |
| 7,340,726 | B1* | 3/2008 | Chelf | G06F 8/71 714/38.12 |
| 7,437,713 | B2* | 10/2008 | Beardsley | G06F 11/3664 717/103 |
| 7,596,778 | B2* | 9/2009 | Kolawa | G06F 11/3688 717/126 |
| 7,614,042 | B1* | 11/2009 | Hardy | G06F 11/3688 717/124 |
| 7,823,135 | B2* | 10/2010 | Horning | G06F 21/14 717/127 |
| 7,840,944 | B2* | 11/2010 | Brunswig | G06F 11/3688 714/38.1 |
| 7,870,535 | B2* | 1/2011 | Rippert, Jr. | G06F 8/20 717/100 |
| 8,171,459 | B2* | 5/2012 | Oja | G06F 11/3612 717/124 |
| 8,239,826 | B2* | 8/2012 | Elenburg | G06F 11/3414 717/110 |
| 8,413,117 | B1* | 4/2013 | Coughlan | G06F 11/3688 714/36 |
| 8,924,935 | B1* | 12/2014 | Chopra | G06F 8/71 717/120 |
| 8,972,940 | B2* | 3/2015 | Kannan | G06F 8/77 717/124 |
| 9,514,034 | B1* | 12/2016 | Griffin | G06F 11/3688 |
| 9,934,016 | B1* | 4/2018 | Acosta | G06F 8/61 |
| 9,965,377 | B1* | 5/2018 | Russell | G06F 11/3684 |
| 9,996,451 | B2* | 6/2018 | Andrejko | G06F 11/3672 |
| 10,289,539 | B1* | 5/2019 | Arguelles | G06F 11/3692 |

OTHER PUBLICATIONS

Jiang et al, "Automated Performance Analysis of Load Tests", IEEE, pp. 125-134 (Year: 2009).*

Chunye et al, "Based on the Analysis of Mobile Terminal Application Software Performance Test", IEEE, pp. 391-394 (Year: 2017).*

Azodolmolky et a, "Performance Evaluation of a Scalable Software-Defined Networking Deployment", IEEE, pp. 68-74 (Year: 2013).*

Boone et al, "Automated deployment of distributed software components with fault tolerance guarantees", IEEE, pp. 21-27 (Year: 2008).*

Wang et al, "Early-Stage Performance Modeling and its Application for Integrated Embedded Control Software Design", ACM, pp. 110-114 (Year: 2004).*

Hall et al, "A Cooperative Approach to Support Software Deployment Using the Software Dock", ACM, pp. 174-183 (Year: 1999).*

Pressler et al, "Execution Cost Estimation for Software Deployment in Component-based Embedded Systems", ACM, pp. 123-128 (Year: 2014).*

Ganguly et al, "Reducing Complexity of Software Deployment with Delta Configuration", IEEE, pp. 729-732 (Year: 2007).*

* cited by examiner

METHOD AND SYSTEM FOR MANAGING DEPLOYMENT OF SOFTWARE APPLICATION COMPONENTS BASED ON SOFTWARE PERFORMANCE DATA

INTRODUCTION

Aspects of the present disclosure relate to managing the deployment of software projects, and more specifically to using performance data to identify performance issues in software projects during software development and deployment processes.

BACKGROUND

In some development environments, software may be deployed in a continuous development pipeline. A continuous development pipeline may include a plurality of stages in the development pipeline, with each stage representing a different level of progression towards a release or production version of a software artifact (e.g., libraries, user interface components, plugins, and so on used in a software application). An example development pipeline may include an initial stage, one or more testing stages, and a deployment stage. The initial stage may represent a stage in which new software artifacts and updates to existing software artifacts are initially developed and tested for a minimum level of functionality. The one or more testing stages may include different stages to test the integration of the new software artifact or updated software artifact with other software artifacts that make up the software application. These integration tests may ensure that new features work properly, updated features work properly and do not adversely affect other features, and that removed features do not adversely affect the functionality of the software application. The deployment stage of the continuous development pipeline represents a stable release of the software application that may be made available to internal and/or external users for use in a production environment.

The software development lifecycle for a software application, whether built as a desktop application, a mobile application, a web application, or other software executable on a computer system, generally entails development, testing, and release of software artifacts over time. During the software development lifecycle, code may be changed to fix bugs in a previous release of a software artifact, add new features to an application, remove unused or infrequently used features from an application, change the design of the user interface of an application, and so on. Over time, as the code base for a software application changes, the performance of the application may change. For example, adding features that leverage new hardware capabilities may increase the performance of the application on devices that support these new hardware capabilities, but may decrease the performance of the application on devices that do not support these new hardware capabilities. In another example, adding additional code to be executed on a client device or additional resources to be retrieved, processed, and displayed on a client device may decrease the performance of an application. In some cases, developers may notice significant performance degradation between different builds of a software application and modify the source code of one or more software artifacts to address performance degradation issues. In some cases, however, performance degradation may accumulate over time such successive builds of a software application may have relatively small differences in performance, but builds of a software application separated by progressively larger amounts of time may have progressively larger differences in performance.

Thus, what is needed are techniques for managing the deployment of software artifacts to minimize performance impacts on a software application.

BRIEF SUMMARY

Certain embodiments provide a method for deploying software application components in a software development pipeline having multiple deployment environments. The method generally includes transmitting, to a performance testing system, information identifying a test build of a software application component in a first deployment environment in a software development pipeline to test. Performance information for the test build of the software application component is received from the performance testing system. The received performance information for the test build of the software application component is compared to one or more of predetermined performance parameters or historical performance data for the software application component. Based on the comparing, the system takes one or more actions to manage deployment of the test build of the software application component to a second deployment environment in the software deployment pipeline.

Other embodiments provide a system comprising a processor and a non-transitory computer readable medium that, when executed, causes the processor to perform an operation for deploying software application components in a software development pipeline having multiple deployment environments. The operation generally includes transmitting, to a performance testing system, information identifying a test build of a software application component in a first deployment environment in a software development pipeline to test. Performance information for the test build of the software application component is received from the performance testing system. The received performance information for the test build of the software application component is compared to one or more of predetermined performance parameters or historical performance data for the software application component. Based on the comparing, the system takes one or more actions to manage deployment of the test build of the software application component to a second deployment environment in the software deployment pipeline.

Still further embodiments provide a system for deploying software application components in a software development pipeline having multiple deployment environments. The system generally includes one or more test servers associated with the multiple deployment environments and a project management system. The project management system generally transmits, to a performance testing system, information identifying a test build of a software application component in a first deployment environment in a software development pipeline to test. Performance information for the test build of the software application component is received from the performance testing system. The received performance information for the test build of the software application component is compared to one or more of predetermined performance parameters or historical performance data for the software application component. Based on the comparing, the system takes one or more actions to manage deployment of the test build of the software application component to a second deployment environment in the software deployment pipeline.

Still further embodiments provide a computer readable medium having instructions stored thereon which, when executed on a processor, performs an operation for deploying software application components in a software development pipeline having multiple deployment environments. The operation generally includes transmitting, to a performance testing system, information identifying a test build of a software application component in a first deployment environment in a software development pipeline to test. Performance information for the test build of the software application component is received from the performance testing system. The received performance information for the test build of the software application component is compared to one or more of predetermined performance parameters or historical performance data for the software application component. Based on the comparing, the system takes one or more actions to manage deployment of the test build of the software application component to a second deployment environment in the software deployment pipeline.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
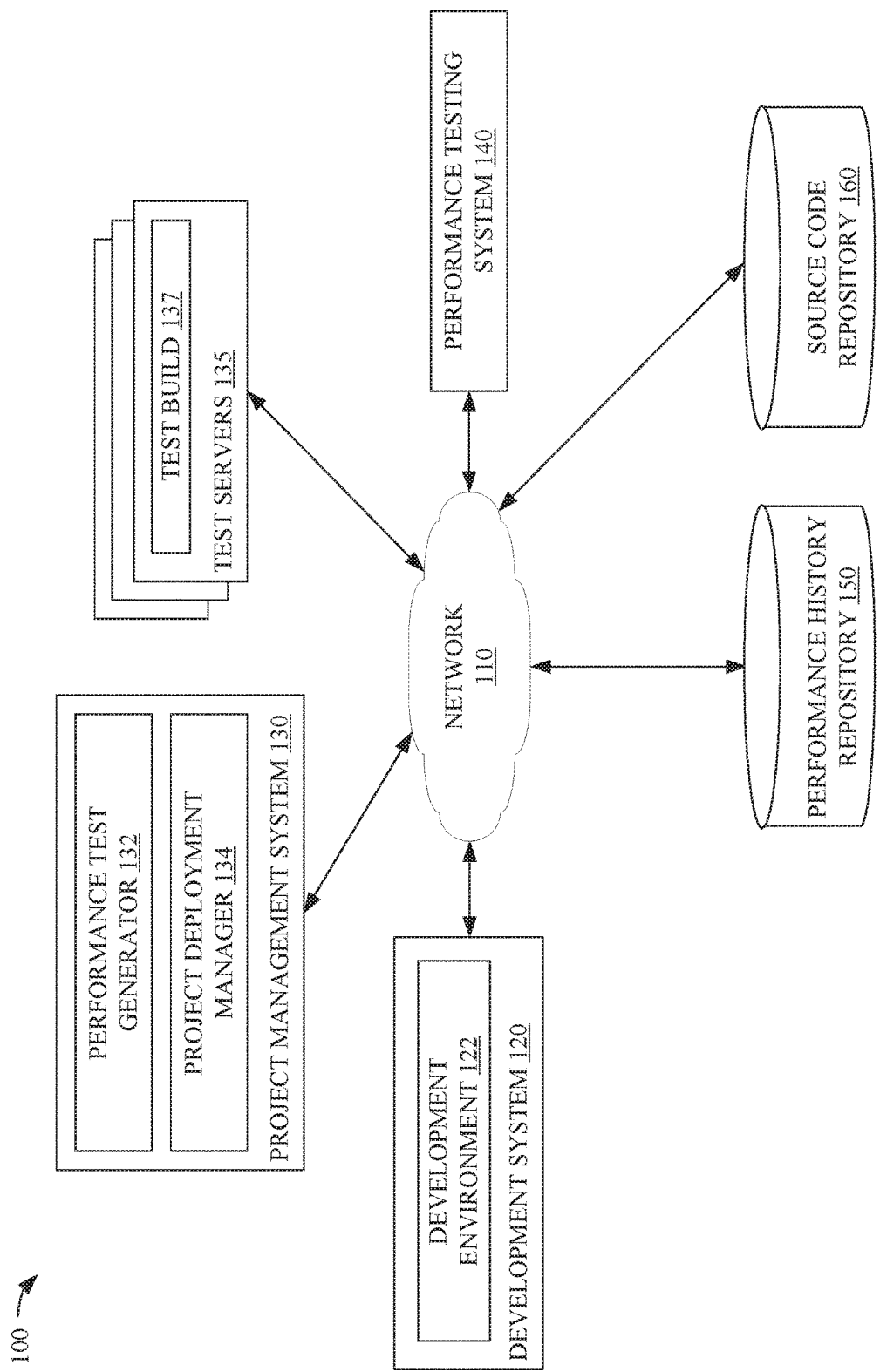
FIG. 1 depicts an example networked environment in which software application components are deployed in a software development pipeline based on performance tests executed on the software application components.

Aspects of the present disclosure provide apparatuses, methods, processing systems, and computer readable mediums for managing the deployment of software applications based on performance testing. The software applications tested and deployed using the techniques described herein may include web applications, native applications utilizing web application components, other remotely accessed resources, or native applications for which performance may be measured. Generally, software applications may be built from a plurality of discrete components corresponding, for example, to different software libraries shared by a plurality of components, discrete components corresponding to different features of the software application, and the like. These discrete components may be developed independently and deployed independently to a production environment as developers of these components determine that these components deliver the intended functionality for a component.

As discussed in further detail herein, developers of a component of a software application may initiate a performance test when a developer attempts to commits source code for the component of the software application to a source code repository. Performance testing systems and performance visualization systems may be made available as components of an overall development environment, and the performance tests executed by the performance testing systems may act as a gatekeeper that controls whether the source code related to the commit attempt is allowed to be committed to the source code repository and merged or promoted with the source code associated with a particular stage of the software development pipeline for the software application. In some embodiments, committing source code for the component may include an attempt to promote the source code for the component of the software application to a source code repository associated with a different stage of a software development pipeline. In response to the attempt to commit source code to the source code repository associated with another stage of the software development pipeline, one or more performance tests may be executed against a version of the component compiled or executed from the source code to be committed to the source code repository, and the performance data for the component compiled or executed from the source code to be committed to the source code repository may be compared to one or more performance metrics, such as baseline performance requirements for the component or historical performance data for the component. If the comparison of the performance data for the component compiled or executed from the source code to be committed with the one or more performance metrics indicates that the component meets performance requirements defined for the component, the source code may be committed to the source code repository associated with the next stage of the software development pipeline. Otherwise, the attempt to commit the source code may be blocked, and in some embodiments, a developer may be notified of the performance metrics that caused the attempt to commit the source code to be blocked. By using performance data to control the promotion of source code for different software components to more advanced stages of the software development pipeline, embodiments of the present disclosure may prevent source code with performance issues from being promoted to release versions of a software application. Performance issues in different components of a software application may be identified during the development process (e.g., in pre-release stages of the software development pipeline) and rectified before the source code for a software component is promoted, for example, to a pre-release or release version of the software application. Further, by performance testing source code before promoting component source code to another stage of the development pipeline, embodiments of the present disclosure may improve system availability and system uptime by preventing poorly performing source code from being promoted, for example, to a pre-release or release stage of the software development pipeline where the source code may be publicly used and may adversely affect the user experience for a software application.

Example Networked Environment for Managing Deployment of Software Applications Based on Performance Testing FIG. 1 illustrates a networked environment 100 in which source code for components of a software application are promoted in the software development pipeline based on performance testing data for the component. As illustrated, networked environment 100 includes a development system 120, a project management system 130, one or more test servers 135, a performance testing system 140, a performance history repository 150, and a source code repository 160, connected via network 110.

Development system 120 generally allows a software developer to create and edit source code for a software project, debug the source code, and attempt to commit the source code to a source code repository, such as source code repository 160. Development system 120 is intended to be representative of any computing system that a software developer can use to develop and test components of a software application, such as a desktop computer, a laptop computer, tablet-based computer, a virtualized computer system executing in a cloud environment, and other suitable computing systems.

As illustrated, development system 120 includes a development environment 122. Development environment 122 generally includes a text editing interface, one or more code compilers and/or interpreters, a local debugging environment, and a code commitment interface. The text editing interface generally allows a developer to create and edit source code files that are or will be used to create a software component. The code compilers and/or interpreters generally read the source code files associated with a project to create a component of the software application and attempts to generate executable or interpretable code used to execute the component of the software application on development system 120. If the code compilers and/or interpreters encounter errors in generating the executable or interpretable code, the code compilers and/or interpreters can halt a code build process and inform the user of the one or more lines of source code that caused the code build process to fail. The local debugging environment executes the generated executable or interpretable code and allows a developer to test the functionality of the component. In some embodiments, the local debugging environment may include one or more components that allow a developer to view the current state of variables during execution of the software application, pause, resume, and step through execution of the software application, and so on. After a user of development system 120 determines that the source code is in condition to be committed to source code repository 160, the user of development system 120 can use a project management system interface included in development environment 122 to interact with project management system 130, through which the user initiates an attempt to commit the source code to source code repository 160 and execute performance testing on the source code to be committed to source code repository 160.

Project management system 130 generally exposes an interface for configuring performance tests on a component associated with source code to be committed to source code repository 160 and, based on the performance data returned from performance testing system 140, manages the commitment of project source code to source code repositories associated with different stages of a software development pipeline. As illustrated, project management system includes a performance test generator 132 and a project deployment manager 134.

Performance test generator 132 generally generates a prompt for a user to define parameters of a test to be executed on a test build of a software application component represented by a defined set of source code. In some embodiments, the prompt may be generated in response to an attempt to commit source code for the software application component to a source code repository 160 (e.g., to promote the source code for the software application component from one stage of a software development pipeline to another stage of the software development pipeline). These attempts to commit source code for the application component may include pull requests in a code management system that merges the source code identified in the pull requests with existing code in the code management system. The prompt for the user to define test parameters for testing the source code may include, for example, a request for information about a number of tests to execute against the software application component, the geographical origin of the tests to be executed (e.g., what server locations performance testing system 140 is to initiate testing from), the data sets to use in executing the test on the software application component, the web browser agents to use to test the software application component (e.g., in a web application context), and other parameters. Based on the user-defined parameters, performance test generator 132 can transmit information defining the one or more performance tests to execute against the software application component to a performance testing system 140 for execution against one or more identified test servers 135.

After performance testing system 140 executes the one or more tests on a test build 137 related to the tested source code, project deployment manager 134 receives the performance data for the executed one or more tests and takes one or more actions to manage deployment of the tested source code in the software development pipeline. Performance testing system 140 compares the received performance data to performance parameters and/or historical performance data to determine whether to allow the source code associated with the tested component to be committed to a source code repository associated with the next stage of the software development pipeline, relative to the stage of the software development pipeline in which the tested source code resides, or block the commit from completing. Generally, as discussed in further detail herein, project deployment manager 134 can allow the source code associated with the tested component to be committed to source code repository 160 associated with the next stage of the software development pipeline (e.g., copied to the source code repository for the $n+1^{th}$ stage of the software development pipeline from the $n^{th}$ stage of the software development pipeline) if the received performance data falls within performance parameters defined for the component of the software application. In some embodiments, project deployment manager 134 may additionally or alternatively use historical performance data to determine whether to allow the source code associated with the tested component to be promoted to the next stage of the software development pipeline block the promotion of the source code to the next stage of the software development pipeline. Promotion to the next stage of the software development pipeline may include, for example, commitment of the source code to a source code repository 160 associated with the next stage of the software development pipeline (e.g., where each stage of the software development pipeline is associated with a particular source code repository 160) or designation of particular versions of source code in source code repository 160 in manifests or other documentation defining the source code included at a particular stage of the software development pipeline.

In some embodiments, the performance parameters defined for a component of a software application being tested may include, for example, minimum and maximum request thresholds, execution time thresholds, resource size thresholds, time to load resources into a browser window, and other performance parameters. Each of these performance parameters may define acceptable performance for a component of the software application, where the defined acceptable performance allows for the use of enough resources (bandwidth, storage, processing time, and so on) to perform a given task and sets an upper bound of resource utilization by the component of the software application to prevent the consumption of excess resources or otherwise prevent the component from blocking performance of other tasks in the software application The resource utilization metrics may differ based on a platform on which the software application is deployed. For example, if the software application is deployed on a mobile device, the resource utilization metrics may indicate that the software application is allowed to use a limited amount of system memory and/or storage or that the software application is allowed a maximum amount of processor utilization; in contrast, if the software application is deployed on a distributed system, these resource utilization metrics may be defined with a recognition that a significantly larger amount of resources are available for the software application to use. In some embodiments, the performance parameters may additionally be defined for each scenario executed against the test build of the software application component generated from the source code to be committed to source code repository 160. These scenarios may include, for example, the use of different data set sizes to test the software application, accessing the software application from different geographical locations, the use of different web browser rendering engines to access the software application, the use of network connections with different speeds to access the software application, and other scenarios that may be encountered during execution of the software application. If the received performance data for the test build of the software application component does not meet the defined performance parameters for the component of the software application being tested, project deployment manager 134 can determine that the source code used to generate the test build should not be promoted to the next stage of the software development pipeline (e.g., committed to the source code repository 160 associated with the next stage of the software development pipeline or written to a manifest defining the versions of source code in the repository associated with the next stage of the software development pipeline). Based on this determination, project deployment manager 134 can generate a notification to the user of development system 120 indicating that the attempt to commit the source code to the source code repository 160 associated with the next stage of the software development pipeline failed. In some embodiments, project deployment manager 134 may additionally indicate to the user the one or more performance parameters that the source code failed to meet to aid developers of the source code in modifying the source code to comply with the one or more performance parameters defined for the software application component. These indications may be received, for example, as visual notifications in development environment 122, messages received through a chat interface, electronic mail, short message service (SMS) or multimedia message service (MMS) messages, or other notifications that may be transmitted to a development system 120 or other user devices for display.

In some embodiments, project deployment manager 134 may use historical performance data for the software application component to determine whether to allow or block the source code associated with the test build of the software application component from being promoted to the next stage of the software development pipeline (e.g., committed to the source code repository 160 associated with the next stage of the software development pipeline or written to a manifest defining the versions of source code in the repository associated with the next stage of the software development pipeline). The received performance data may include, for example, a number of requests for resources generated in executing the software application component, a loading time associated with each resource used by the software application component, an execution time for resources written in JavaScript or other dynamically compiled and executed languages, the size of resources retrieved in executing the software application component, and so on. By using historical performance data to determine whether to allow or block source code from being committed to source code repository 160 associated with the next stage of the software development pipeline or otherwise promoted to the next stage of the software development pipeline, project deployment manager 134 can identify gradual performance degradation over the history of the software application component and alert developers to the gradual performance degradation of the software application component. Identification of gradual performance degradation over the history of the software application component may include, for example, identifying a trend showing a gradual decline in the performance of the software application component, slopes of trend lines identified from historical performance, or other appropriate manners by which performance degradation over time may be identified. In some embodiments, performance of different builds of the software application component may be indexed or weighted against performance of the devices on which the software application component executes. For example, a particular percentage increase in the performance of the devices on which the software application component executes may be included in the identification of performance trends for the software application component to further allow for the identification of performance degradation over the history of the software application component. To compare the historical performance of the software application component to the current performance of the software application component (e.g., the performance of the tested build of the software application component generated from the source code identified in a commit request), project deployment manager 134 generally retrieves historical performance data for m previous builds of the software development project in the same stage of the software development pipeline for comparison.

In one example, project deployment manager 134 may calculate a performance delta between the previous build of the software application component and the current test build of the software application component. If the performance delta between the previous and current test builds of the software application component exceeds a threshold amount, project deployment manager 134 can determine that the performance test for the test build of the software application component failed. Based on this determination, project deployment manager 134 can block the source code from being committed to the source code repository 160 associated with the next stage of the software development pipeline.

In another example, project deployment manager 134 may calculate a performance delta between an average performance of the m previous builds of the software application component and the current test build of the software application component. In some embodiments, the calculated average performance of the m previous builds of the software application component may be a simple average of the measured performance of the n previous builds of the software application component, represented by the equation:

$$avgPerformance = \frac{\sum_{i=0}^{m} perfData_m}{m}$$

where $perfData_m$ represents the measured performance of the $m^{th}$ build of the software application component.

In some cases, the average performance calculated for m previous builds of the software application component may be calculated as a weighted average of the measured performance of the m previous builds of the software application component. For example, the weighted average may apply larger weights to the performance data associated with more recent builds of the software application component and, correspondingly, apply smaller weights to the performance data associated with older builds of the software application component. The calculated average performance as a weighted average of the measured performance of the m previous builds may be represented by the equation:

$$avgPerformance = \frac{\sum_{i=0}^{m} weight_m * perfData_m}{m}$$

where $weight_m$ represents a weighting factor associated with the $m^{th}$ build of the software application component and $perfData_m$ represents the measured performance of the $m^{th}$ build of the software application component.

In some embodiments, the performance level calculated for historical and current test builds of the software application component may be generated according to weighting factors associated with each scenario tested on the software application component. In one example, in a test of an application component across different web browsers or user agents rendering a web application component, the weighting factors may be defined based on the percentage of web traffic received from users of each web browser, and the calculated performance level may be defined as the sum of the weighted performance data for each web browser tested. Illustratively, suppose that 60 percent of real-world requests for the software application component come from users of web browser A, 25 percent of real-world requests for the software application component come from users of web browser B, and 15 percent of real-world requests for the software application component come from users of web browser C. The calculated performance level for the software component may thus be calculated as (0.60*$perfData_{BrowserA}$)+(0.25*$perfData_{BrowserB}$)+(0.15*$perfData_{BrowserC}$).

Other non-limiting examples of performance metrics for which a weighted performance level may be calculated include performance on a geographical basis (e.g., how performance differs for users of a software application component based on the geographic location from which the user is accessing the software application component from), performance for different sizes of data sets users provide to the software application component, performance for different network bandwidths for users of the software application, different hardware platforms on which the software application component executes, and so on. Similarly to the examples described above, if the weighted historical performance level for the software application differs from the weighted performance level for the current test build of the software application, project deployment manager 134 can determine that the performance tests for the current test build of the software application component failed.

In some embodiments, project deployment manager 134 may save or otherwise commit the received performance data to performance history repository 150 for use in making future determinations of whether to allow or block source code for a software application component from being committed to source code repository 160, as discussed above. Using the received performance data and historical performance data stored in performance history repository 150, project deployment manager 134 may additionally generate one or more visualizations illustrating a performance history over a number of previous builds of the software application component. In some embodiments, the visualizations may include graphs showing a number of passed and failed tests over a time period, trend charts showing performance trends for different builds of a software development project, and other visualizations that may aid in show performance and performance trends over the history of the software application component.

Test servers 135 generally host one or more execution environments for software application components built and tested through project management system 130. Test servers 135 are generally illustrative of any computer system on which a software application can execute and serve application content to one or more remote systems (e.g., performance testing system 140 or one or more client devices), including individual physical servers, physical servers in a distributed computing environment, virtualized computers or virtualized workloads executing in a shared computing environment, and so on. Test build 137 is generally deployed on one or more test servers 135 for testing. In some embodiments, the source code used to generate test build 137 may include the source code stored in source code repository 160 associated with a particular stage of the software development pipeline.

Performance testing system 140 generally initiates one or more simulated workloads on a test build 137 executing on one or more test servers 135 and records the performance of the test build 137 for the one or more simulated workloads. Performance testing system 140 transmits the recorded performance information for the one or more simulated workloads to project management system 130 for processing, commitment to performance history repository 150, and use in determining whether to allow or block a code commit request from completing, as discussed above.

Performance history repository 150 generally provides a storage repository for performance data related to test builds of a software application component. Source code repository 160 generally provides a storage repository for source code for the software application component. Performance history repository 150 and source code repository 160 may be structured as relational databases, non-relational databases, flat file stores, or any other appropriate data storage system that may be used to store the respective data in each repository. In some embodiments, source code repository 160 may maintain a versioning system for the source code committed to source code repository through project management system 130. The versioning system generally allows a developer to designate a particular state of the source code repository as a milestone or stable version of the source code defining the software application, and developers of the software application can revert to the designated milestone or stable version of the source code in cases where a later source code commit has introduced instability, performance issues, or other errors into a previously stable code base.

While project management system 130, test servers 135, performance testing system 140, performance history repository 150, and source code repository 160 are illustrated as separate components in FIG. 1, it should be recognized by one of ordinary skill in the art that project management system 130, test servers 135, performance testing system 140, performance history repository 150, and source code repository 160 may be implemented on any number of computing systems, either as one or more stand-alone systems or in a distributed environment.

Figure 2:
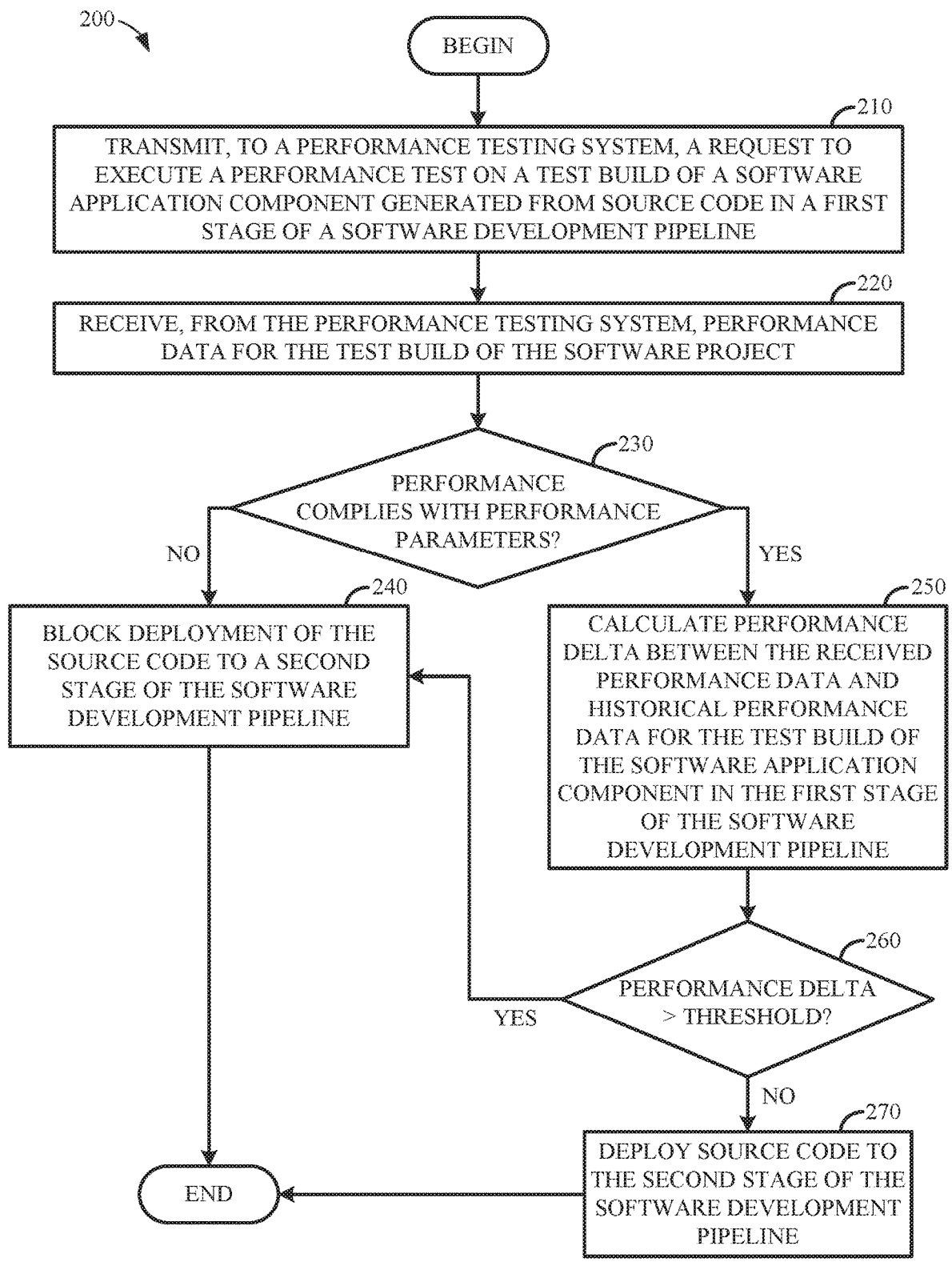
FIG. 2 illustrates example operations for deploying software application components in a software development pipeline based on performance data for a test build of a software project.

Example Computer Implemented Method for Managing Deployment of Software Applications Based on Performance Testing FIG. 2 illustrates example operations 200 for managing deployment of source code for a test build of a software component in a software development pipeline, according to an embodiment of the present disclosure.

As illustrated, operations 200 begin at block 210, where a system transmits, to a performance testing system, a request to execute a performance test on a test build of a software application component. The test build of the software application component may be built from source code in a first stage of a software development pipeline. In some embodiments, the request to execute a performance test on a test build of a software application component may be generated in response to a user-initiated request to commit source code for the software application component to a source code repository (e.g., source code repository 160 associated with a later stage of the software development pipeline). In some embodiments, the request to execute a performance test on a test build may be generated independently of a request to commit source code for the software application component to a source code repository, with the results of the performance test being used to determine whether to allow the source code to be committed to the source code repository 160 associated with a later stage of the software development pipeline when a commit request is received.

The request to execute a performance test on the test build of the software application component generally includes one or more parameters defining the tests to be executed on the test build of the software application component. The parameters may be received, for example, concurrently with a request to commit source code to the source code repository 160 (explicitly in a request accompanying the commit request or implied in the commit request) or in response to a prompt generated by project management system 130 in response to receiving a request to execute a performance test on the test build of the software application component. As discussed, the request may be received independently of a request to commit source code. These parameters may include information identifying one or more tests to be executed on the test build of the software application component. For example, the parameters may indicate a number of tests to be executed and different execution parameters for each of the different tests to be executed, such as the origin of requests to execute the one or more tests, data sets used to execute the one or more tests, system or network bandwidths to simulate in executing the one or more tests, web browsers or user agents to use in executing tests against software application components including elements executing in a web browser, and so on.

At block 220, the system receives, from the performance testing system, performance data for the test build of the software project. The performance data generally includes one or more values for different performance indicators defined for the software application component. These performance indicators may include, for example, a number of requests for external resources generated by the software application component, an execution time for code compiled or interpreted on a client device (e.g., for JavaScript libraries used by the software application component), a loading time for resources displayed on the client device, and performance indicators.

At block 230, the system determines whether the performance of the test build of the software application component complies with performance parameters defined for the software application component. The system may determine whether the performance of the test build of the software application component compiles with performance parameters, for example, by determining whether performance indicators are within an acceptable range, are less than a maximum performance value defined for the software application component, are greater than a minimum performance value defined for the software application component, and so on. If the system determines that the received performance data does not meet the performance parameters defined for the software application data, then at 240, the system can block deployment of the source code to a second stage of the software development pipeline. At block 240, the system may terminate a pending source code commit request or block a subsequent source code commit request until the performance data for the test build of the software application component complies with the performance parameters for the software application component. In some embodiments, the system may additionally transmit one or more notifications to the user initiating the commit request or performance test request indicating the one or more performance parameters for which the test build failed. As discussed, the one or more notifications may be transmitted to development system 120 for notification in development environment 122, as a chat message displayed in a chat interface on development system 120, as an e-mail or other electronic message readable on a user's computer or mobile device, or as other electronic notifications as may be appropriate.

If, however, at block 230 the system determines that the performance of the test build of the software application component complies with the defined performance parameters, at block 250, the system calculates a performance delta between the received performance data and historical performance data for the test build of the software application component. The historical performance data used to calculate the performance delta may, in some embodiments, be the performance data associated with previous builds of the software application component in the first stage of the software development pipeline.

At block 260, the system determines whether the calculated performance delta exceeds a threshold value. The threshold value may, for example, indicate a maximum percentage change in the performance of the software application component over a period of time. The threshold value may be a global value applicable to any software application component in the application or individually configured values applicable to specific software application components in the application. By determining whether the calculated performance exceeds a threshold value, the system can identify gradual changes in the performance of the software application component, such as changes that gradually decrease the performance of the software application component such that the performance of the software application component will eventually not comply with the performance parameters discussed above with respect to block 230. If the calculated performance delta exceeds the defined threshold value, operations 200 may proceed to block 240 to block deployment of the source code to the second stage of the software development pipeline, which may preemptively allow developers to improve the performance of the software application component before the performance of the software application component degrades to a point at which the performance of the software application component fails to comply with the performance parameters defined for the software application component. Otherwise, at block 270, the system deploys the source code to the second stage of the software development pipeline. In some embodiments, deploying the source code to the second stage of the software development pipeline may include writing, to a source code repository associated with the second stage of the software development pipeline, the source code used to generate the test build as a new version of the source code for the software application component to merge the source code into the code base at the second stage of the software development pipeline.

Figure 3:
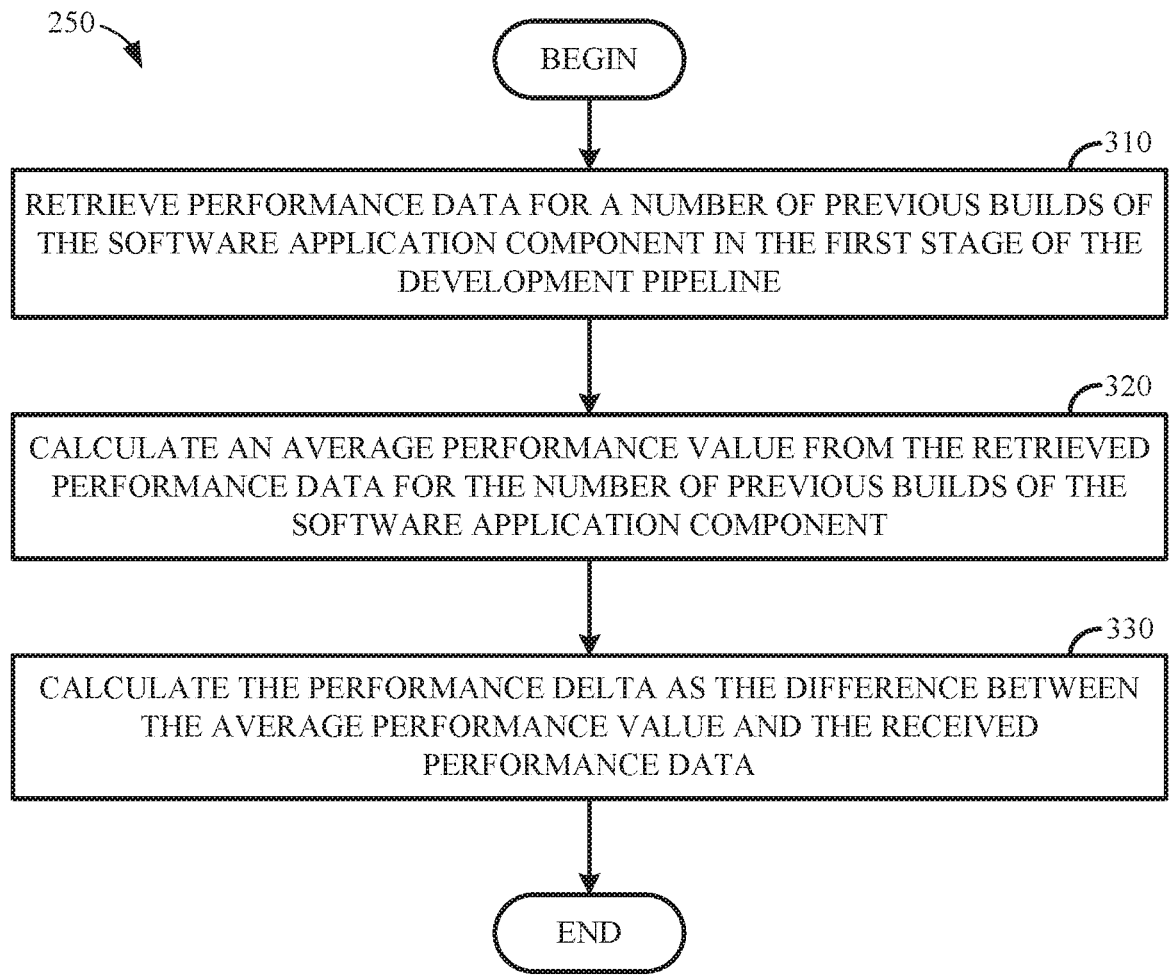
FIG. 3 illustrates example operations for calculating a performance delta between different builds of a software project.

FIG. 3 illustrates example operations 300 for calculating a performance delta between received performance data for the test build of the software application component and historical performance data for the test build of the software application component. Operations 300 represent an example of the operations that may be performed at block 250 described above with respect to FIG. 2.

As illustrated, operations 300 may begin at block 310, where the system retrieves performance data for a number of previous builds of the software application component in the first stage of the development pipeline. The system generally retrieves this data from a repository, such as performance history repository 150 in FIG. 1, by requesting performance data associated with the software application component over a set time period (e.g., prior x days of performance data), a number of builds of the software application component (e.g., they most recent records in performance history repository 150), or the like.

At block 320, the system calculates an average performance value from the received performance data for the number of previous builds of the software application component. As discussed above, the average performance value may be calculated as a simple average of the performance of a number of previous builds or a weighted average assigning, for example, less weight to the performance data for older builds of the software application component and more weight to more recent builds of the software application component. These are just two examples, and other schemes are possible.

At block 330, the system calculates a performance delta as the difference between the average performance value and the received performance data. In some embodiments, where performance of the software application component is expected to be relatively consistent, the performance delta may be calculated as an absolute value. In some embodiments, the performance delta may be calculated to reflect performance improvements as a positive value and performance degradation as a negative value, or vice versa.

Figure 4:
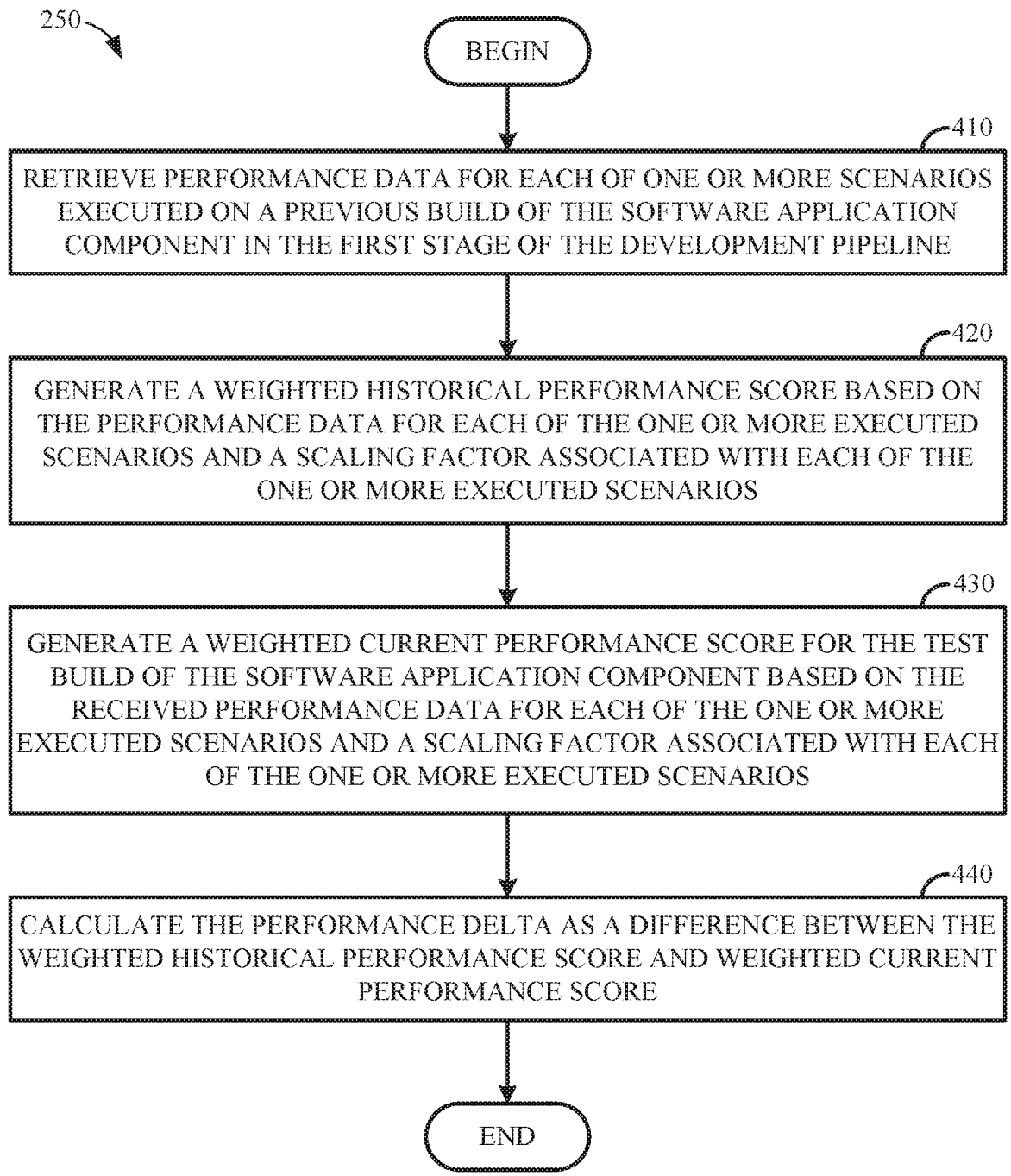
FIG. 4 illustrates example operations for calculating a performance delta between different builds of a software project for multiple scenarios executed against the software project.

FIG. 4 illustrates example operations 400 for calculating a performance delta between received performance data for the test build of the software application component and historical performance data for different scenarios executed on the test build of the software application component. The use of weighted performance scores for an application component allows for performance issues that negatively impact larger groups of users to be weighted more heavily so that these issues are identified and rectified before the source code for a software application component is promoted to a later stage of the software development pipeline (e.g., is included in pre-release or release versions of the application). Operations 400 represent an example of the operations that may be performed at block 250 described above with respect to FIG. 2.

As illustrated, operations 450 begin at block 410, where the system retrieves performance data for each of one or more scenarios executed on a previous build of the software application component in the first stage of the development pipeline. As described above, the system generally retrieves this data from performance history repository 150 by requesting performance data associated with the software application component over a set time period (e.g., prior x days of performance data), a number of builds of the software application component (e.g., the y most recent records in performance history repository 150), or the like. The system may additionally specify, in requesting or querying for this data from performance history repository 150, the scenarios to obtain performance data for.

At block 420, the system generates a weighted historical performance score for the software application component. The weighted historical performance score may be generated based on the performance data for each of the one or more executed scenarios and a scaling factor associated with each of the one or more executed scenarios. The scaling factor may be defined, for example, based on historical data associated with the software application component, relative importance to a development team of different scenarios executed on the software application component, or based on other factors as appropriate.

For example, in testing web browser responsiveness for the software application component, the weighted score may be generated according to the percentage of traffic initiated by users of each of one or more web browsers. In another example, to test how the software application component works across different sizes of input data sets, the weighted score may be generated according to the percentages of users associated with different size classes for the input data set (e.g., in an accounting application, data sets associated with small companies, mid-sized companies, and large companies). It should be recognized that these examples are non-limiting, and the weighted scores discussed herein may be generated according to any appropriate weighting factors defined for the software application component. To generate the weighted historical performance score, the system can calculate an average historical performance score for each scenario and multiply the calculated average performance score by the scaling factor associated with each scenario. The weighted average historical performance score for each scenario may be aggregated to calculate the weighted historical performance score.

At block 430, the system generates a weighted current performance score for the test build of the software application component. The weighted current performance score may be generated based on the received performance data for each of the one or more executed scenarios and a scaling factor associated with each of the one or more executed scenarios. In some embodiments, to facilitate a direct comparison between historical and current performance data, the system may use the same the scaling factors to calculate the weighted historical performance score and weighted current performance score.

At block 440, the system calculates the performance delta as a difference between the weighted historical performance score and weighted current performance score. As discussed above with respect to the calculation of the performance delta in FIG. 3, the performance delta may be calculated as an absolute value or as a signed value where one sign (e.g., positive values) represent performance improvements and the opposite sign (e.g., negative values) represent performance degradation.

Figure 5:
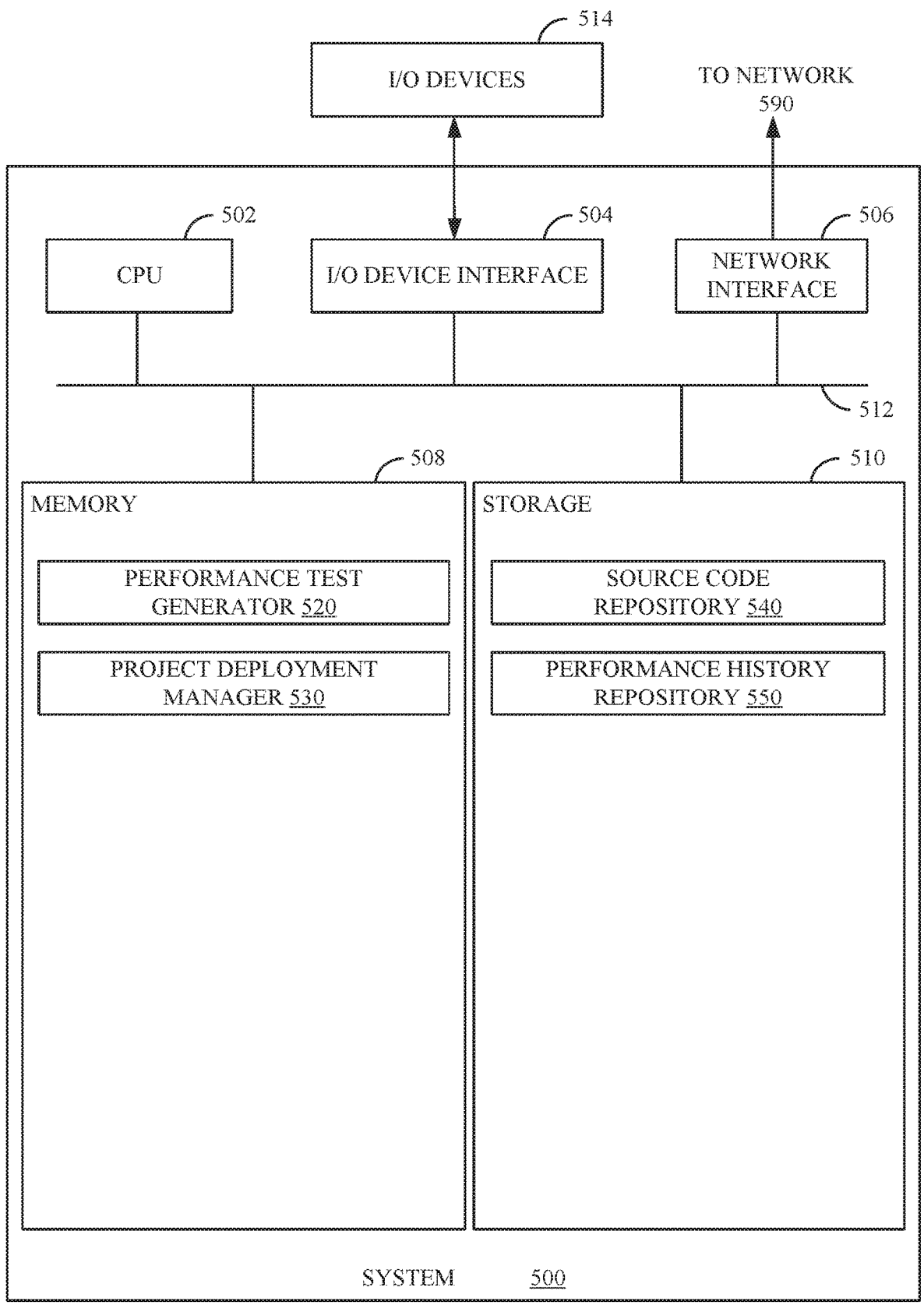
FIG. 5 illustrates an example computing system with which embodiments of the present disclosure may be implemented.

Example System for Managing Deployment of Software Application Components Based on Performance Testing FIG. 5 illustrates an example system 500 for managing deployment of software application components in a software development pipeline based on performance testing executed on the software application components. For example, system 500 may be representative of project management system 130 illustrated in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 590 (which may be a local network, an intranet, the Internet, or any other group of computing devices communicatively connected to each other and represented by network 110 illustrated in FIG. 1), a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a performance test generator 520 and project deployment manager 530. Performance test generator 520 may be representative of performance test generator 132 illustrated in FIG. 1, and project deployment manager 530 may be representative of project deployment manager 134 illustrated in FIG. 1. Performance test generator 520 generally receives, from a developer, a request to initiate a performance test on a test build of a software application component. As discussed, the request may be received explicitly with a request to commit code to source code repository 540, implicitly in the request to commit code to source code repository 540, or independently of a request to commit code to source code repository 540. Performance test generator 520 receives information defining the one or more tests to be executed on the test build of the software application component and transmits a request, via network interface 506, to one or more performance testing systems to execute the defined tests on the test build of the software application component.

Project deployment manager 530 uses the performance data received from the one or more performance testing systems to determine whether or not to commit source code associated with the test build of the software application component to the source code repository 540 associated with the next stage in the software development pipeline. As discussed, project deployment manager 530 can use performance parameters defined for the software application component and comparisons between current and historical performance data to allow the source code associated with the test build of the software application component to be committed and merged with the source code of the next stage of the software development pipeline or block completion of the source code commit.

Storage 510 includes a source code repository 540 and a performance history repository 550. As discussed above, source code repository 540 may include software application source code for one or more stages in the software development pipeline. As source code for a software application component is developed and passes performance tests, the source code for the software application component may be merged into successively more advanced stages of the software development pipeline (e.g., from development, to validation testing, to prerelease, and to release). Performance history repository 550 provides a searchable repository of historical performance data that project deployment manager 530 can use to determine whether to allow a source code commit to commit software application component source code to the next stage of the software development pipeline.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for deploying software application components in a software development pipeline having multiple deployment environments, comprising:

transmitting, to a performance testing system, information identifying a test build of a software application component in a first deployment environment in a software development pipeline to test;

receiving, from the performance testing system, performance information for the test build of the software application component;

comparing the received performance information for the test build of the software application component to one or more of predetermined performance parameters to determine whether the received performance information complies with the predetermined performance parameters or historical performance data for the software application component; and based on the comparing, taking one or more actions to manage deployment of the test build of the software application component to a second deployment environment in the software development pipeline, wherein the one or more actions comprises at least:

identifying, from the received performance information, components in the test build of the software application component having a decrease in performance between the test build of the software application component and one or more previous builds of the software application component exceeding a threshold value;

generating a notification including information about the identified components; and transmitting the notification to an end user.

2. The method of claim 1, wherein comparing the received performance information for the test build of the software application component to historical performance data for the software application component comprises: calculating a performance delta between the received performance information of the test build of the software application component and performance of one or more previous builds of the software application component in the first deployment environment.

3. The method of claim 1, wherein the one or more actions to manage deployment of the test build of the software application component to the second deployment environment comprises blocking deployment of the test build to the second deployment environment if the calculated performance delta indicates that performance degradation relative to performance of a previous build of the software application component exceeds the threshold value.

4. The method of claim 1, further comprising: transmitting, to the performance testing system, information identifying one or more scenarios to execute on the test build of the software application component in the first deployment environment, wherein the received performance information includes performance information for each of the one or more scenarios.

5. The method of claim 4, wherein comparing the received performance information for the test build of the software application component to historical performance data for the software application component comprises:

calculating, for each scenario of the one or more scenarios, a performance delta between the test build of the software application component and one or more previous builds of the software application component in the first deployment environment, wherein taking one or more actions to manage deployment of the test build to the second deployment environment further comprises blocking deployment of the test build if the performance delta associated with any scenario of the one or more scenarios exceeds a threshold value.

6. The method of claim 4, wherein the information identifying one or more scenarios to execute on the test build of the software application component in the first deployment environment comprises one or more of:

information identifying a set of geographic locations to access the test build of the software application component from;

information identifying one or more data sets to provide as input to the test build of the software application component;

information identifying one or more web browser agents to use to access the test build of the software application component; or information identifying one or more network bandwidths to use to access the test build of the software application component.

7. The method of claim 1, wherein the performance information comprises timing information for loading each component in the test build of the software application component in a browser window.

8. The method of claim 1, further comprising: saving the received performance information for the test build of the software application component in the first deployment environment to a historical data repository.

9. The method of claim 8, further comprising: generating, from historical performance information for the software application component in the first deployment environment, one or more visualizations illustrating performance trends for the software application component over a period of time.

10. The method of claim 1, wherein the historical performance data comprises a weighted average performance measured over a number of previous builds of the software application component, and wherein newer builds are associated with larger weights than older builds.

11. An apparatus, comprising:

a processor; and a memory having instructions stored thereon which, when executed on the processor, performs an operation for deploying software application components in a software development pipeline having multiple deployment environments, the operation comprising:

transmitting, to a performance testing system, information identifying a test build of a software application component in a first deployment environment in a software development pipeline to test;

receiving, from the performance testing system, performance information for the test build of the software application component;

comparing the received performance information for the test build of the software application component to one or more of predetermined performance parameters to determine whether the received performance information complies with the predetermined performance parameters or historical performance data for the software application component; and based on the comparing, taking one or more actions to manage deployment of the test build of the software application component to a second deployment environment in the software development pipeline, wherein the one or more actions comprises at least:

identifying, from the received performance information, components in the test build of the software application component having a decrease in performance between the test build of the software application component and one or more previous builds of the software application component exceeding a threshold value, generating a notification including information about the identified components, and transmitting the notification to an end user.

12. The apparatus of claim 11, wherein comparing the received performance information for the test build of the software application component to historical performance data for the software application component comprises: calculating a performance delta between the received performance information of the test build of the software application component and performance of one or more previous builds of the software application component in the first deployment environment.

13. The apparatus of claim 11, wherein the one or more actions to manage deployment of the test build of the software application component to the second deployment environment comprises blocking deployment of the test build to the second deployment environment if the calculated performance delta indicates that performance degradation relative to performance of a previous build of the software application component exceeds threshold value.

14. The apparatus of claim 11, wherein the operation further comprises: transmitting, to the performance testing system, information identifying one or more scenarios to execute on the test build of the software application component in the first deployment environment, wherein the received performance information includes performance information for each of the one or more scenarios.

15. The apparatus of claim 14, wherein comparing the received performance information for the test build of the software application component to historical performance data for the software application component comprises:
calculating, for each scenario of the one or more scenarios, a performance delta between the test build of the software application component and one or more previous builds of the software application component in the first deployment environment,
wherein taking one or more actions to manage deployment of the test build to the second deployment environment further comprises blocking deployment of the test build if the performance delta associated with any scenario of the one or more scenarios exceeds a threshold value.

16. The apparatus of claim 14, wherein the information identifying one or more scenarios to execute on the test build of the software application component in the first deployment environment comprises one or more of:
information identifying a set of geographic locations to access the test build of the software application component from;
information identifying one or more data sets to provide as input to the test build of the software application component;
information identifying one or more web browser agents to use to access the test build of the software application component; or information identifying one or more network bandwidths to use to access the test build of the software application component.

17. The apparatus of claim 11, wherein the performance information comprises timing information for loading each component in the test build of the software application component in a browser window.

18. The apparatus of claim 11, further comprising: saving the received performance information for the test build of the software application component in the first deployment environment to a historical data repository, and wherein the operation further comprises: generating, from historical performance information for the software application component in the first deployment environment, one or more visualizations illustrating performance trends for the software application component over a period of time.

19. The apparatus of claim 11, wherein the historical performance data comprises a weighted average performance measured over a number of previous builds of the software application component, and wherein newer builds are associated with larger weights than older builds.

20. A system for deploying software application components in a software development pipeline having multiple deployment environments, comprising:
one or more test servers executing test builds of software application components; and
a project management system configured to:
transmit, to a performance testing system, information identifying a test build of a software application component in a first deployment environment executing on the one or more test servers in a software development pipeline to test;
receive, from the performance testing system, performance information for the test build of the software application component;
compare the received performance information for the test build of the software application component to one or more of predetermined performance parameters to determine whether the received performance information complies with the predetermined performance parameters or historical performance data for the software application component; and
based on the comparison, take one or more actions to manage deployment of the test build of the software application component to a second deployment environment in the software development pipeline, wherein the one or more actions comprises at least:
identifying, from the received performance information, components in the test build of the software application component having a decrease in performance between the test build of the software application component and one or more previous builds of the software application component exceeding a threshold value,
generating a notification including information about the identified components, and
transmitting the notification to an end user.

* * * * *